US005525133A

United States Patent [19]

Haukeness

[11] Patent Number: 5,525,133

[45] Date of Patent: Jun. 11, 1996

[54] GAS PIPELINE DRIP

[75] Inventor: Miles E. Haukeness, Chatham, Canada

[73] Assignee: St. Clair Pipelines Ltd., Ontario, Canada

[21] Appl. No.: 282,952

[22] Filed: Jul. 29, 1994

[51] Int. Cl.[6] .......... B01D 35/02

[52] U.S. Cl. .......... 55/307; 55/423; 55/426; 55/466

[58] Field of Search .......... 55/423, 425, 426, 55/257.5, 257.6, 218, 391, 280, 307, 466, 462

[56] References Cited

U.S. PATENT DOCUMENTS

| | | | |
|---|---|---|---|
| 414,373 | 11/1889 | Burnham | 55/444 |
| 523,929 | 7/1894 | Culver | 55/423 |
| 555,553 | 3/1896 | Austin | 55/423 |
| 761,114 | 5/1904 | Waggoner | 55/423 |
| 1,311,573 | 7/1919 | Newburgh | 55/423 |
| 1,328,889 | 1/1920 | Oleson | 55/423 |
| 1,784,627 | 12/1930 | Hamill | 55/452 |
| 3,199,272 | 8/1965 | Oehlrich et al. | 55/261 |
| 3,279,155 | 10/1966 | Lambert | 55/218 |
| 3,545,179 | 12/1970 | Nelson et al. | 55/426 X |
| 3,603,062 | 9/1971 | Robbins et al. | 55/348 |
| 3,769,781 | 11/1973 | Klein et al. | 55/426 X |
| 3,788,282 | 1/1874 | Modrak et al. | 55/423 X |
| 3,926,594 | 12/1975 | Seib et al. | 55/423 X |
| 4,180,391 | 12/1979 | Perry, Jr. et al. | 55/324 |
| 4,205,972 | 6/1980 | Visos et al. | 55/417 |

FOREIGN PATENT DOCUMENTS

| | | | |
|---|---|---|---|
| 827123 | 5/1981 | U.S.S.R. | 55/426 |

OTHER PUBLICATIONS

Oil & Gas Journal, Jan. 21, 1991 pp. 37–40, article entitled "Calculations Predict Condensate Movement at T Junctions".

AIChe Journal, (vol. 22, No.1), Jan. 1976, pp. 47–55, article entitled "A Model for Predicting Flow Regime Transitions in Horizontal and Near ".

Oil & Gas Journal, Jan. 28, 1991, pp. 91–93, article entitled "Experiments Verify Predictions of Condensate Movements".

"Horizontal Gas–Liquid Flow".

*Primary Examiner*—Richard L. Chiesa
*Attorney, Agent, or Firm*—Jacobson, Price, Holman & Stern

[57] ABSTRACT

Known drips for gas transmission pipelines do not work effectively for two phase liquid-gas flows. Disclosed is a drip having two parts; a flow separator and a receptacle. The flow separator comprises a pipe having circumferential apertures in the wall. Surrounding the pipe and the apertures is a shell that defines an annular passage between the pipe wall and the shell. Annular gas liquid flow entering the separator will be divided. Most of the gas will pass the apertures and continue through the pipe. Most if not all of the liquid and some gas will pass through the aperture. It is then passed to a receptacle where the fluid is removed. The secondary gas flow is then either recombined with the main flow or can be diverted to a secondary system. Periodically the liquid collected in the receptacle can be emptied.

21 Claims, 6 Drawing Sheets

——— GAS FLOW

- - - - - - - LIQUID

GAS PIPELINE DRIP

BACKGROUND OF THE INVENTION

1. Field of the Invention

This invention relates to a gas-liquid separation, more specifically gas transmission pipeline drips for removing liquid contaminants from gas streams.

2. Description of the Related Art

Underground natural gas transmission pipelines may be contaminated by liquids during operation. Such liquid contaminants include hydrocarbon condensations, lubrication oils, produced water, and chemicals used in the production, treatment, compression or dehydration of the gas. These contaminants may cause injury to or interfere with the proper operation of the lines, regulators, filters, meters or other appliances.

Gas transmission pipelines use "drips" which are installed in the pipeline at regular intervals to collect the liquid contaminants. These drips must often be designed to allow a device called a "pig" to travel internally along the length of the pipe without obstruction. A cleaning pig is used to mechanically remove contaminants which have collected in areas such as low spots in the pipeline. An inspection pig uses instruments to record features such as geometry, wall thickness and orientation of the pipeline. It is important that the drip not detrimentally effect the gas flow through the pipeline by creating head losses in the proximity of the drip. Yet the drip should also be effective in removing liquid contaminants.

The drawback of using traditional drips is that their efficiency may be adequate for stratified two-phase gas-liquid flow regimes; however, the efficiency decreases at higher gas velocities where the two-phase flow regime changes from stratified to annular flow.

There are known devices for removing from a gas stream, suspended particulate such as liquid droplets. For example U.S. Pat. No. 4,180,391 issued Dec. 25, 1979 to Perry, Jr. et al. discloses a device which uses vortical generators to create a swirling motion in a gas stream. In Perry, the particles are removed from the gas stream with a portion of gas (scavenging gas) through ejection ports of the tube, into a housing chamber. The pressure in the housing chamber is greater than in the conduit, which would inhibit movement of liquid out of the tube at high gas velocities. In Perry, this pressure differential is employed to draw the scavenging gas back into the main stream, further downstream in the conduit. However, the vortical generator employed by perry obstructs the tube. Thus operation of a pig would not be possible in Perry. Furthermore, Perry is designed for use with low gas flow rates, thus requiring vortical generators to force the particulates to the wall of the conduit.

It is an object of this invention to provide a gas pipeline drip which can allow free passage of cleaning and inspection pigs but which effectively separates liquid contaminants at both low and high gas velocities.

SUMMARY OF THE INVENTION

The principle of annular flow separation is based upon two-phase flow separation theory. In gas-liquid two-phase flow, where the superficial gas velocities are relatively low (perhaps in the range of 1 m/s to 7 m/s) the flow pattern is stratified, with the liquid forming a low level layer, with the layer of gas flowing above. However, in gas-liquid two-phase flow under higher superficial gas velocities (gas flow rate/cross section area) and low superficial liquid velocity, the two-phase flow pattern is normally an annular flow pattern (i.e. the liquid generally flows only near the wall and the gas flows mainly in the centre of the pipe)—see Taitel, Y. and Dukler, A. E., 1976 American Institute of Chemical Engineering Journal, Vol. 22, p. 47. The actual superficial gas velocity at which the flow regime will change from stratified to annular varies in any particular situation depending upon such factors as the viscosity, pressure, temperature, specific gravity, etc.

When annular two-phase gas flow, having a relatively low liquid hold up value (6% or lower), approaches a side branch "T" section in a flow tube, the liquid film, or at least a significant portion thereof, flowing along the wall near the side branch, flows into the side branch. The liquid holdup value is the fraction of the cross sectional area occupied by the liquid phase. This flow into the side branch is due to the reduction of gas pressure in the side branch tubes by the fast flow in the main flow tube, as would be expected with the numerical modelling of Fortuin, J. M. H., Hamersma, P. J., Hart, J., Smith, H. J. and Baan, W. P., Oil & Gas Journal, Jan. 28, 1991, p. 91.

If there is a branch to a tube, that is joined as a T-junction, there will be a disturbance of the static pressure distribution. With regard to single pressure gas flow in such a system, the primary gas flow continuing through the tube past the T-junction, there will be a static pressure recovery. However, for the secondary gas flow into the branch, there will be a static pressure decrease. Thus, there will be a pressure difference between the main conduit and the branch, just after the T-junction. The particular static pressure difference will depend on factors including the frictional loss coefficient at the junction, the amount of gas extracted into the branch and the particular geometry of the junction.

When there is two-phase gas-liquid flow, a pressure difference for the liquid approaching the T-junction will result between the main pipe or tube and the junction. The velocity of the liquid in the main pipe or tube will drop, increasing the pressure, and the velocity of liquid in the branch will increase, resulting in a pressure decrease. It is believed that the resulting pressure difference is caused by the division of gas flow and creates a driving force for the liquid.

The amount of liquid that is extracted into the branch will depend upon how large the axial momentum of the liquid is in the inlet, compared to this driving force. Providing that the axial momentum of the liquid is small, the result will be that the liquid will be forced into the branch.

The separator design of the present invention takes advantage of the recognition that gas-liquid flow in transmission line is often annular; superficial gas velocities in gas transmission pipelines are often in the range of 30–45 ft/s wherein the flow will typically be annular. The separator design utilizes the principal of reduction of gas pressure in a side branch and the corresponding withdrawal of liquid flow and applies it to a drip. The concept is extended to an entire pipe wall; there are no T-junctions per se. When the gas liquid flow is annular the liquid flow velocity will be relatively low. Thus the axial momentum will be low and by creating a pressure reduction surrounding the outer wall of the pipeline, most, if not all, the liquid film will be drawn out into an annular chamber.

The two-phase flow pattern in the liquid separation zone where the conduit is discontinuous is required to be annular to maintain liquid suspension and not allow re-entry into the main conduit. Therefore The size of the annular chamber is restricted to allow the gas velocity through the separation zone to be sufficient to carry the liquids past the final main conduit re-entry point. The secondary gas flow together with the liquids removed will travel through the annular chamber to pass into a storage receptacle where the liquids are collected for disposal.

The cleansed secondary gas flow may then be returned to the main gas flow.

According to one aspect of the invention there is provided a drip for use in a pipeline system for removing liquid contaminants contained in a two-phase liquid-gas stream. The drip comprises a flow separator and a receptacle. The receptacle has a receptacle chamber. The flow separator comprises a pipe permitting fluid flow therethrough and has a longitudinal axis and a pipe wall, and an inlet and an outlet. The pipe wall has a first aperture set comprising at least one aperture located between the inlet and the outlet. Also there is an outer shell having a shell wall enclosing the pipe from a first position between the inlet and the first aperture set, to a second position between the first aperture set and the outlet. The shell wall and the pipe wall define a first annular chamber therebetween, with the pipe being in fluid communication with the first annular chamber through the said first aperture set. A first fluid communication means provides for fluid communication between the first annular chamber and the receptacle chamber.

A second fluid communication means provides for fluid communication between the receptacle and the pipe at a location between the first annular chamber and the outlet. The first annular chamber and the first and second fluid communication means are configured such that when a two-phase annular flow of a liquid and a gas is forced into the inlet toward the outlet, a primary stream comprised of substantially all gas will pass the first aperture set and a secondary stream comprised of substantially all the liquid and a portion of the gas will flow from the pipe through the first aperture set into the first annular chamber maintaining an annular flow until at least the secondary stream has passed the first aperture set. Thereafter the secondary stream will flow from the first annular chamber into the first fluid communication means, thereafter to said receptacle chamber. The receptacle chamber is sized to permit the deposition of fluid in the receptacle from the secondary stream. The gas from said secondary stream will thereafter flow from the receptacle through the second fluid communication means to reenter said pipe and recombine with said primary gas stream downstream of said first annular chamber.

Optionally, the second fluid communication means may be connected to a secondary system and not recombine with the primary gas flow.

According to another aspect of the invention there is provided a drip for use in a pipeline system for removing liquid contaminants contained in a two-phase liquid-gas stream. The drip comprises a flow separator and a receptacle. The receptacle has a receptacle chamber. The flow separator comprises a pipe permitting fluid flow therethrough having a longitudinal axis and a pipe wall. The pipe has an inlet and an outlet and the pipe wall has a first aperture set comprising at least one aperture, and a second aperture set comprising at least one aperture. The first aperture set is located between the inlet and the outlet, and the second aperture set is located between the first aperture set and the outlet. The pipe also has an intermediate portion extending between the first aperture set and the second aperture set. An outer shell having a shell wall encloses the pipe from a first position between the inlet and the first aperture set, to a second position between the second aperture set and the outlet. The shell wall and the pipe wall define an annular chamber therebetween. Also provided are a means for dividing the annular chamber into a first annular chamber located proximate the first aperture set and a second annular chamber located proximate the second aperture set. The pipe is in fluid communication with said first annular chamber through said first aperture set and also being in fluid communication with the second annular chamber through the second aperture set. A first fluid communication means provides for fluid communication between the first annular chamber and the receptacle chamber. A second fluid communication means provides for fluid communication between the second annular chamber and the receptacle chamber. The first annular chamber, the second annular chamber and the first and second fluid communication means are all configured such that when a two-phase annular flow mixture of a liquid and a gas is forced into the inlet toward the outlet, a primary stream comprised of substantially all gas will pass by the first aperture set directly into said intermediate portion and a secondary stream comprised of substantially all the liquid and a portion of the gas will flow from said pipe through said first aperture set into said first annular chamber maintaining an annular flow until at least the secondary stream has passed the first aperture set, and thereafter the secondary stream will flow from the first annular chamber into the first fluid communication means, thereafter into the receptacle chamber. The receptacle chamber is sized to permit the deposition of fluid in the receptacle from the secondary stream. The portion of gas in the secondary stream will thereafter flow from the receptacle through the second fluid communication means into the second annular chamber to reenter the pipe through the second aperture set to recombine with the primary gas stream downstream of the said first annular chamber. The recombined flow of gas emits the pipe at the outlet.

DETAILED DESCRIPTION OF THE ILLUSTRATED PRIOR ART DESIGNS

Figure 1:
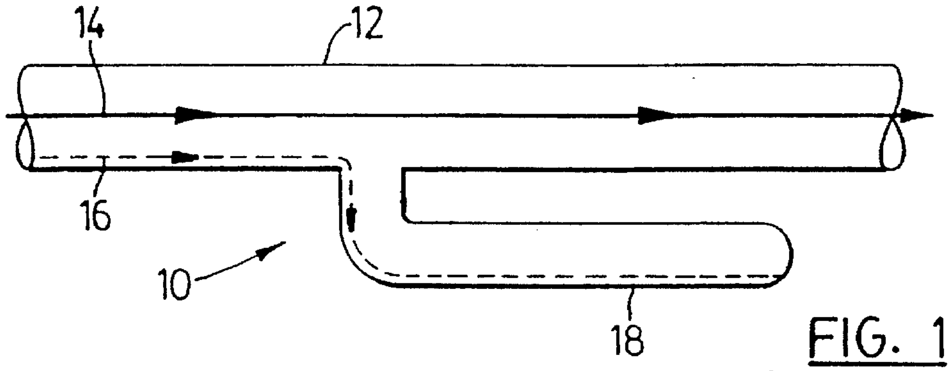
FIG. 1 (PRIOR ART)
FIG. 1 illustrates a schematic elevation cross-sectional view of a prior art piggable drip design.
Figure 2:
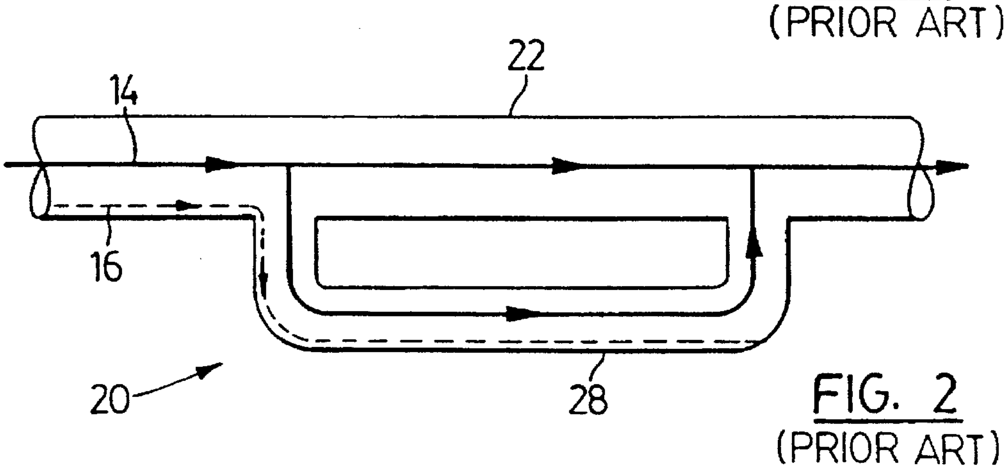
FIG. 2 (PRIOR ART)
FIG. 2 illustrates another simplified elevational cross-sectional view of a prior art piggable drip design.
Figure 3:
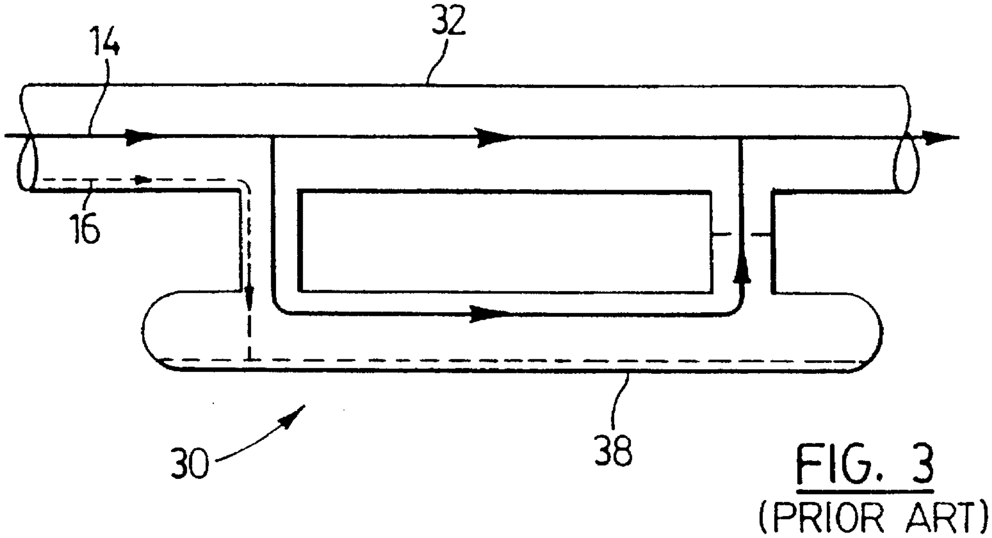
FIG. 3 (PRIOR ART)
FIG. 3 illustrates yet another simplified elevational cross-sectional view of a prior art piggable drip design.

FIGS. 1, 2 and 3 show prior art drip designs. FIG. 1 illustrates a single leg drip 10 installed in a pipeline 12. The gas and liquid flows are shown using solid lines 14 and dashed lines 16, respectively. A receptacle 18 acts as a storage vessel for the liquid. Receptacle 18 includes a nozzle or pipe (not shown) which can be accessed to periodically remove the liquid stored therein. FIGS. 2 and 3 show double leg drips 20 and 30 having receptacles 28 and 38 through which gases may pass to further facilitate the removal of liquid from the gas stream.

A significant limitation with the prior art drip designs is that they are only effective at low gas velocities when the two-phase flow regime is stratified and the liquid flows along the bottom of the pipe. As the gas velocity increases, the annular flow develops, the walls of the pipes 12, 22 and 32 are wetted by a thin film of liquid, while the gas flows through the centre of the pipe. It has been determined that as annular flow behaviour is common for natural gas transmission pipelines during operation, much of the liquid will not be separated from the gas by gravity alone and thus will bypass the piggable drip designs of the prior art.

DETAILED DESCRIPTION OF THE PREFERRED EMBODIMENT

FIGS. 4, 5, 6 and 7 show a drip constructed in accordance with the present invention which utilizes an annular flow separation technique for providing efficient and effective removal of liquid contaminants at both high and low gas flow velocities.

Figure 4:
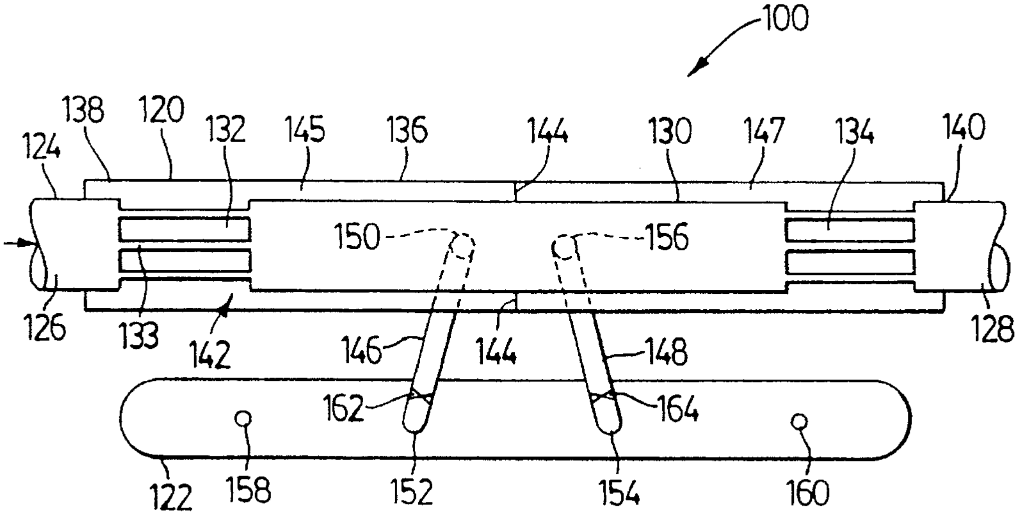
FIG. 4 is a simplified plan sectional view of a piggable drip constructed in accordance with the one embodiment of the present invention.
Figure 5:
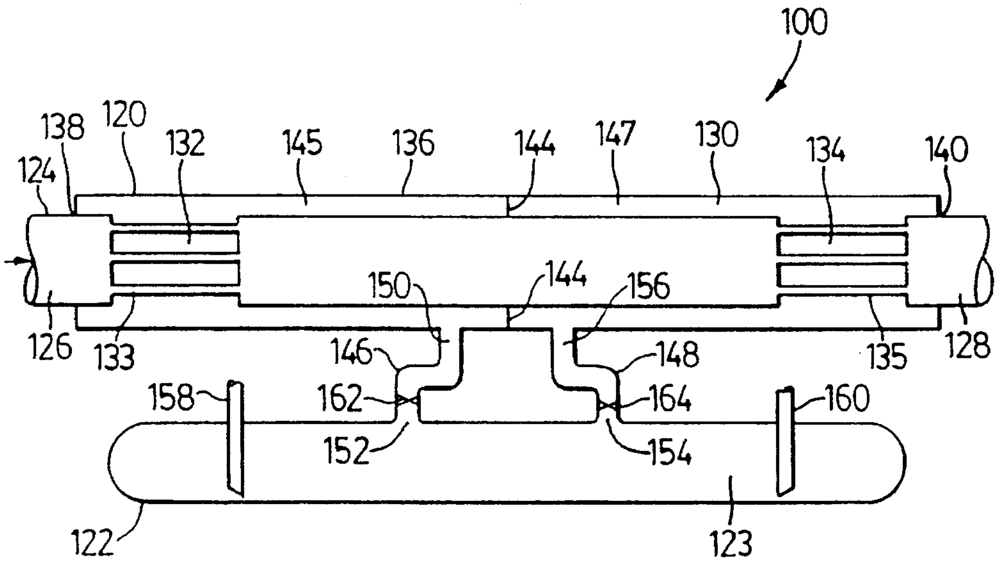
FIG. 5 is a simplified elevational sectional view of a piggable drip of FIG. 4.

Turning to FIGS. 4–7, piggable annular gas pipeline drip 100 constructed in accordance with the present invention is shown in FIGS. 4 and 5. Drip 100 would be installed directly into a gas pipeline. The drip 100 consists of two components; the annular flow separator 120 and the liquid receptacle 122. The liquid receptacle has a chamber 123.

The annular flow separator 120 comprises a main pipe or conduit 124, typically in the form of a cylindrical hollow tube, having a tube wall 121, and has a flow inlet 126 at one end and a flow outlet 128 at the other end. The tube wall 121 of conduit 124 has a longitudinal axis which is linear between inlet 126 and outlet 128. The gas is pumped through conduit 124 from inlet 126 toward outlet 128 by one or more external pumps or compressors (not shown) located upstream of inlet 126, and/or downstream of outlet 128.

Proximate each of inlet 126 and outlet 128 is a set of apertures or slots 132 and 134 respectively in the tube wall 121 itself. Each set of apertures is spaced circumferentially around the tube wall 121. Each aperture has length L. Stretching between apertures 132 and 134 is an intermediate portion 130 of conduit 124. An outer, hollow shell 136 surrounds and encloses conduit 124 between inlet 126 and outlet 128, and encloses apertures 132 and 134. Shell 136 is sealed at ends 138 and 140 about the outer surface of tube wall 121 of conduit 124, to provide a fluid tight, chamber in the form of a concentric cylindrical annulus or annular passage 142 around conduit 124 between ends 138 and 140. The cylindrical annular passage 142 is divided into two separate annular chamber sections 145 and 147 by a baffle 144 which is sealed to both outer shell 136 and conduit 124. Conduit 124 is in fluid communication with annular chamber section 145 through apertures 132, and conduit 124 is in fluid communication with annular chamber section 147 through apertures 134. Chamber section 145 is only in fluid communication with chamber section 147 via receptacle 122 as hereinafter disclosed. Fluid communication directly between chamber section 145 and chamber section 147 is prevented by baffle 144.

Two side branch tubes 146 and 148, located near the baffle 144 at the bottom of the separator 120, provide for fluid communication between the separator 120 and the liquid receptacle 122. Side branch tube 146 is connected to separator 120 at its two-phase flow inlet 150 and connects to receptacle 122 at its two-phase flow outlet 152 to provide for fluid communication between chamber section 145 and receptacle 122. Side branch tube 148 is connected to receptacle 122 at its extracted gas inlet 154 and connects to separator 120 at its extracted gas outlet 156 to provide for fluid communication between chamber section 147 and receptacle 123. Liquid extraction pipes 158 and 160 are provided in receptacle 122 to permit the removal of collected and extracted liquids from the receptacle chamber 123, when desired. Valves 162 and 164 located on the side branch tubes 146 and 148 respectively are used to interrupt the flow of gas and liquid through the tubes 146 and 148 to prevent bypass during pigging operations.

Figure 6:
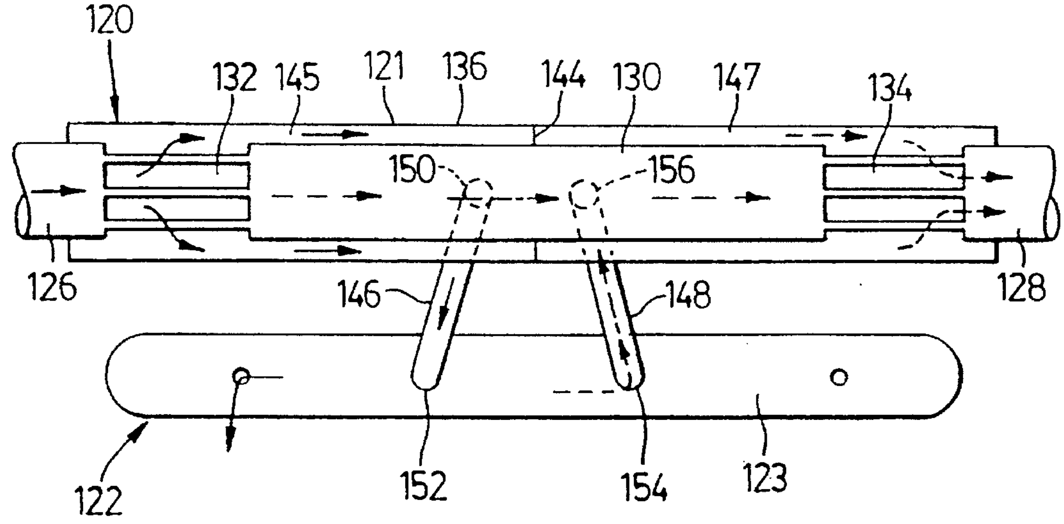
FIGS. 6 and 7 show the same views of FIGS. 4 and 5 with arrows to illustrate the flow of gas and liquid in a drip constructed in accordance with one embodiment of the present invention.
Figure 7:
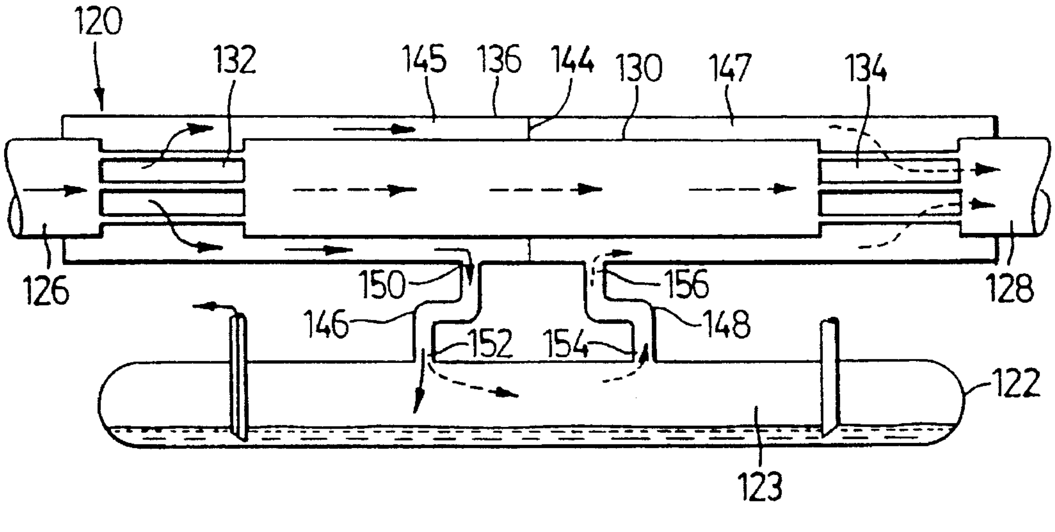

FIGS. 6 and 7 show schematically, the two-phase flow, the gas flow and liquid flow routes in the gas pipeline drip of FIGS. 4 and 5. The liquid flows are shown in solid lines and the gas flows in dashed lines, both with arrows. Gas-liquid, two-phase mixtures are indicated by open arrows.

With reference to FIGS. 6 and 7, the two-phase mixture (open arrows) of gas and liquid enters the separator 120 at inlet 126. At higher gas velocities this flow pattern will be annular as described above. When the annular two-phase flow reaches aperture 132, it is separated at the apertures 132 into a primary gas flow (dashed lines) that will pass into the intermediate portion 130 of conduit 124, and a mixed flow of a secondary gas flow combined with the liquid flow to provide a higher liquid-hold-up value in the secondary flow.

The length L of apertures 132 is limited to the length of sealing surfaces of the cleaning end inspection pigs, if pigging is necessary for a particular conduit 124. Pigs are typically driven through pipelines by gas pressure, and so it is important that the aperture is not too large, otherwise a pig when located at the apertures 132 could become stuck because of gas bypass.

The secondary gas flow with a high liquid-hold-up value passes into chamber section 145 formed as the concentric annular passage located between the tube wall of conduit 124 and the inner surface of the wall of outer shell 136. The secondary flow exits chamber section 145 at tube inlet 150, passes through side branch tube 146 and then enters the liquid receptacle 123 at tube outlet 152.

The two-phase liquid-gas flow separated from the primary gas flow at apertures 132 will retain its annular flow pattern as the flow mixture of liquid and gas passes through chamber section 145. An important balance is required in determining the required size of tube 146 and the cross-sectional area of chamber section 145 in relation to the cross-sectional area of conduit 124. A sufficient velocity of the secondary gas flow in the chamber section 145 is required to maintain an annular flow through the separation zone at and in the vicinity of apertures 132 to prevent the separated liquids from rejoining the primary gas flow. This requirement is met by limiting the size of the chamber section 145. In the preferred embodiment the cross sectional area of tube 146 will be minimized for commercial reasons and be less than the cross sectional area of annular chamber section 145. Large cost savings are achieved with a relatively small diameter tube 146. This likewise is true of tube 148. However it is necessary to ensure that tube 146 is of sufficient size so that the secondary gas flow is not restricted too much to interfere with the annular flow in annular chamber 145. The secondary flow rate in the preferred embodiment will be determined by the size of tube 146 as that is where the maximum gas velocity will occur. This velocity can approach but will not exceed the primary gas flow velocity and thus limit the secondary flow rate to the ratio of areas between tube 146 and conduit 124.

The distinct advantage of annular separation is that a relatively small secondary flow of gas (perhaps in the range of 5 to 10 percent of the primary flow) is used to remove all or substantially all of the liquid. The size of tube 146 required is therefore considerably smaller than the size of the branch connection required at an equivalent efficiency T-junction. Cost and material savings result.

Once the secondary flow enters chamber 123 of receptacle 122, any liquids carried by the gas stream will be removed by gravity, because the velocity of the two-phase gas-liquid stream is reduced significantly once the flow passes into the receptacle. The receptacle should be of sufficient size and configuration to permit this to occur. The minimal size of tube 146 allows significant savings in the size of receptacle required to settle liquids from the gas stream and in the size of valves 162 and 164 required for pigging operations. The extracted or separated gas will then exit receptacle 122 at tube inlet 154 through the side branch tube 148 and be returned to the separator at outlet 156. In this preferred embodiment, the separated secondary gas flow recombines with the primary gas flow in tube 130 by passing through the apertures 134 via annular chamber section 147. The recombined gas flow exits the separator at outlet 128.

A gas pressure drop will occur at or in the vicinity of the edges of the apertures 132, to provide the effect described above. It is this gas pressure differential that drives the liquid into chamber section 145. However, once the two-phase flow is in chamber section 145, the velocity will drop and there will be a resulting overall increase in pressure.

The pressure in tube 146, the pressure in receptacle 122, and the pressure in tube 148, is believed to be generally of the same magnitude as the pressure in the chamber section 145. Likewise the pressure in chamber section 147 will be generally the same, but the pressure will be greater than the pressure in the intermediate portion 130 of the conduit. The overall effect is that the secondary gas flow is drawn through tube 148 and re-enters the conduit 124 to combine with the primary gas flow.

When the superficial gas velocities are relatively low, and the flow pattern in the pipe is stratified, it will also be appreciated that this drip will also operate effectively in a manner similar to the prior art drips described above and shown in FIG. 1–3. Liquid will pass out of conduit 124 through aperture 132 and be carried through tube 146, into receptacle 128, in a manner similar to the prior art devices shown in FIG. 1–3.

Figure 10:
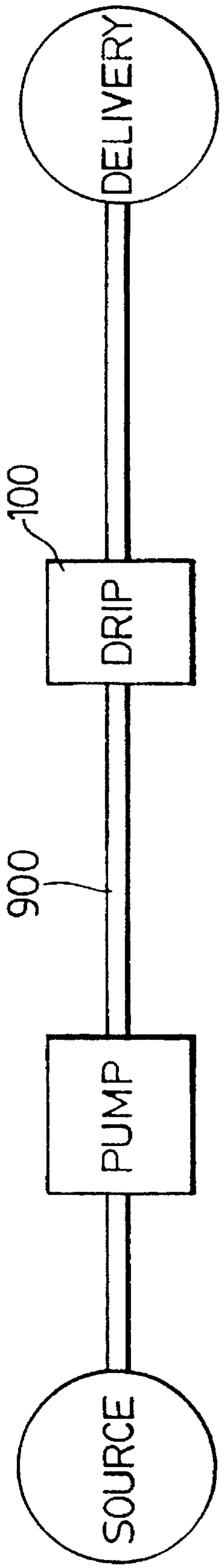
FIG. 10 is a schematic of a pipeline system which would incorporate the present invention.

FIG. 10 shows schematically a simplified gas transmission system. Gas is transmitted from a source by a pump to a delivery location through a pipeline 900. A drip 100 is interposed in the pipeline 900.

The design of the preferred embodiment of the annular flow separator described herein permits unobstructed movement in both directions for cleaning and inspection pigs. Also, as the design is symmetrical, the drip works equally well for gas flows in the opposite direction (ie. from outlet 128 to inlet 126). The piggable annular gas pipeline drip represents a significant development particularly in maintaining the reliable operating integrity of underground natural gas transmission pipelines. Gas pipelines themselves are typically made from steel. The components of the drip can be made of metals, ceramics or polymers.

It will be evident from the foregoing to a person skilled in the art that the specific and relative sizes and shapes of the various components of the drip 100, and in particular the size of the annular passages are important to insure that the desired flow regime is obtained in the drip for a given gas-liquid flow therethrough.

Figure 8:
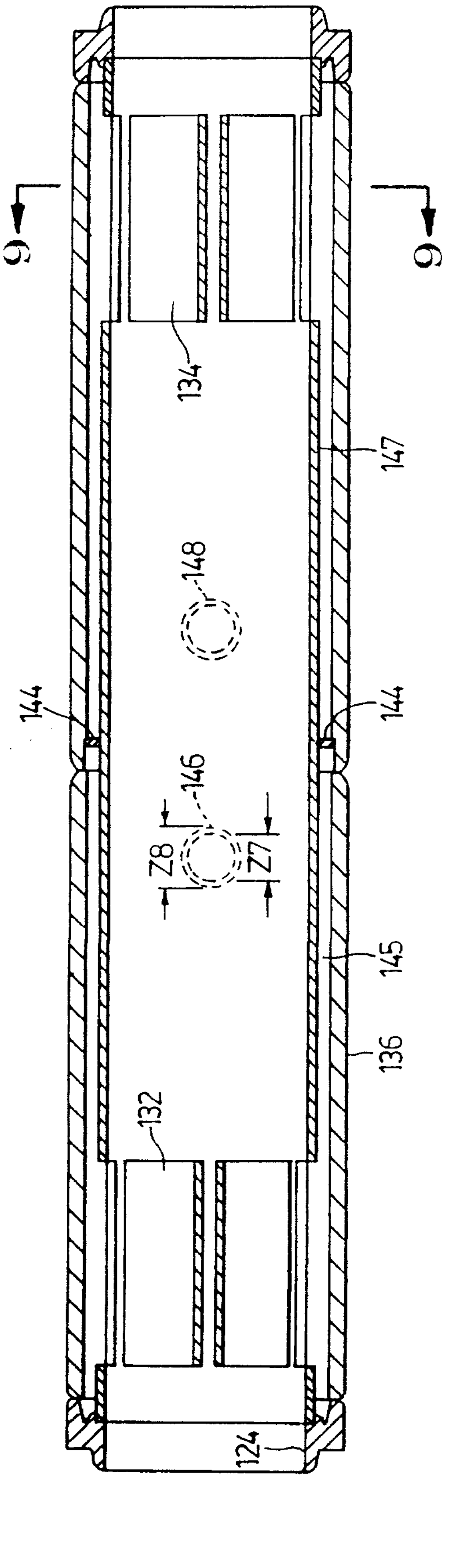
FIG. 8 is an elevational view through part of the piggable drip of FIG. 4.
Figure 9:
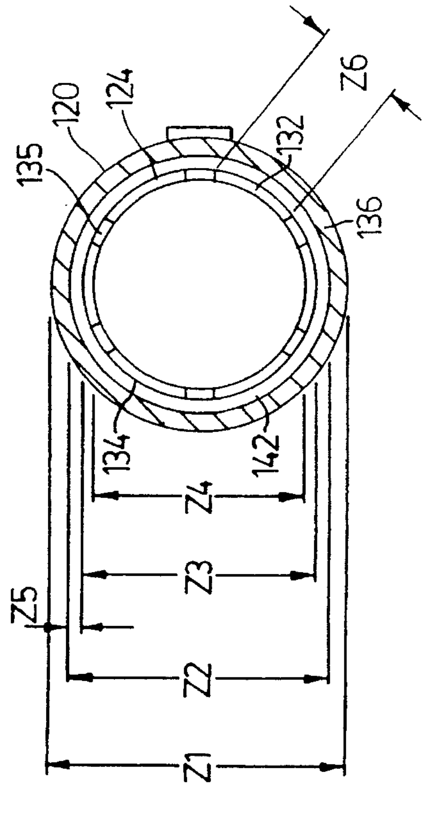
FIG. 9 is a cross-sectional view along A—A in FIG. 8.

It has been determined that a drip 100 with the dimensions illustrated in FIGS. 8, and 9 will be effective for annular flow into the drip having liquid hold-up value in the order of 6% and a gas superficial velocity with in the order of approximately 10 m/s. Drip 100 in FIGS. 8 and 9 has the following approximate specifications:

Z1—outer diameter of shell 136=405 mm

Z2—inner diameter of shell 136=345 mm

Z3—outer diameter of conduit 124=325 mm

Z4—inner diameter of conduit 124=300 mm

Z5—width of annular passages 135 and 137=10 mm

Z6—circumferential width of apertures 132 and 134=130 mm

Z7—interior diameter of tubes 146 and 148=80 mm

Z8—external diameter of tubes 146 and 148=90 mm.

Figure 11:
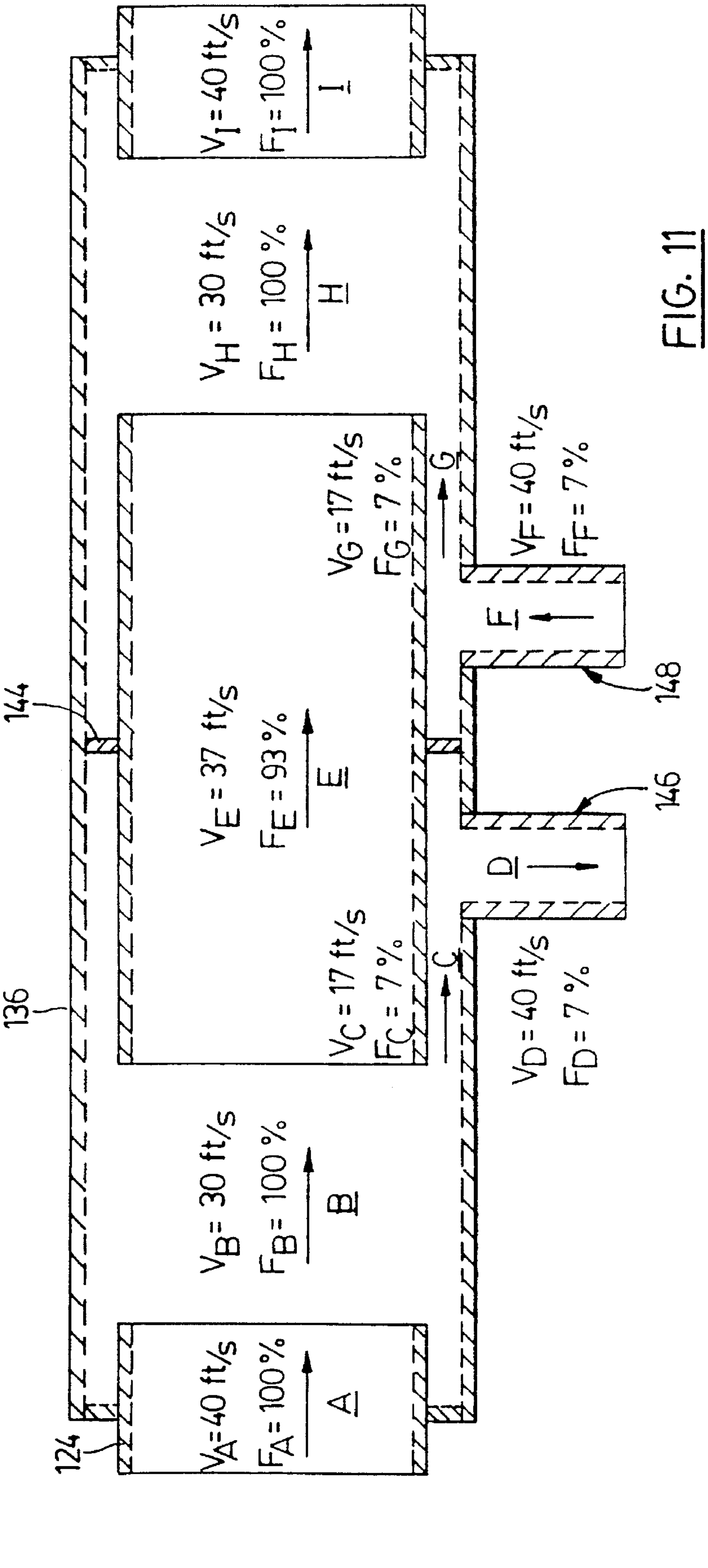
FIG. 11 is a further schematic elevational cross-sectional view of part of the drip of FIGS. 1–4.

With reference to FIG. 11, a sketch of drip 100 illustrates superficial gas velocities and flow percentages that might be expected through the separator in zones A to I, if one introduced a two-phase annular flow having a superficial gas velocity of 40 ft./sec. at the inlet. This is based on the following:

conduit 124 having an interior diameter of 11.75 in and an external diameter of 12.75 in;

shell 136 having an interior diameter of 13.6 in and an external diameter of 16.0 in.;

tubes 146 and 168 having internal diameter of 3.05 in. and external diameters of 3.5 in.

and receptacle 122 having an interior cross-sectional area of 108 sq. in.

One would expect the superficial gas velocity through the receptacle to be approximately 2.7 ft./s.

From the foregoing information, a person skilled in the art will be able to design a drip in accordance with this invention to operate in a particular environment.

Modifications, alterations or variations to the present invention as described in relation to the preferred embodiment may be made without departing from the scope of the present invention as claimed below.

For example, with reference to FIGS. 4 and 5, rather than having apertures 132 in the tube wall of conduit 124, the wall may be absent to provide an intermediate portion spaced from the inlet portion. Thus, the conduit would be discontinuous but have the same flow characteristics. In a conduit that is required to be piggable it would be necessary in such an embodiment to provide some means to support a pig passing through the discontinuity in the conduit. However some conduits do not have to be piggable. In such an non-piggable drip, valves 162 and 164 could also be eliminated.

Furthermore, it is not necessary that the extracted gas flowing out of receptacle 122 be re-combined with the gas flow in the intermediate portion 130, by passing the flow through a second chamber section. Second chamber section 147 and apertures 134 might be eliminated and tube 148 might be connected directly to conduit 124 downstream of the first annular chamber. Such an embodiment would however not provide a drip that operates in both directions.

Also tube 148 may be used to supply clean gas to another system: however, the flow rate would be determined by that system's demand.

I claim:

1. A drip for use in a pipeline system for removing liquid contaminants contained in a two-phase liquid-gas stream, said drip comprising a flow separator, and a receptacle:

said receptacle having a receptacle chamber;

said flow separator comprising:

a pipe permitting fluid flow therethrough, said pipe having a longitudinal axis and a pipe wall, said pipe having an inlet and an outlet, said pipe wall having a first aperture set comprising at least one aperture, said first aperture set located between said inlet and said outlet;

an outer shell having a shell wall enclosing said pipe from a first position between said inlet and said first aperture set, to a second position between said first aperture set and said outlet, said shell wall and said pipe wall defining a first annular chamber therebetween, said pipe being in fluid communication with said first annular chamber through said first aperture set;

a first fluid communication means providing for fluid communication between said first annular chamber and said receptacle chamber;

a second fluid communication means providing for fluid communication between said receptacle and said pipe at a location between said first annular chamber and said outlet;

said first annular chamber and said first and second fluid communication means configured such that when a two-phase annular flow of a liquid and a gas is forced into said inlet toward said outlet, a primary stream comprised of substantially all gas will pass by said first aperture set end a secondary stream comprised of substantially all said liquid and a portion of said gas will flow from said pipe through said first aperture set into said first annular chamber maintaining an annular flow until at least said secondary stream has passed said first aperture set, and thereafter said secondary stream will flow from said first annular chamber into said first fluid communication means, thereafter to said receptacle chamber, said receptacle chamber being sized to permit the deposition of fluid in said receptacle from said secondary stream, said gas from said secondary stream will thereafter flow from said receptacle through said second fluid communication means to reenter said pipe and recombine with said primary gas stream downstream of said first annular chamber.

2. A drip as claimed in claim 1 wherein said first aperture set comprises a plurality of apertures circumferentially spaced around said pipe wall.

3. A drip as claimed in claim 1 wherein said first aperture set comprises a single circumferential aperture providing a discontinuity in said pipe.

4. A drip as claimed in claim 1 wherein said second fluid communication means comprises:

a second annular chamber positioned downstream of said first annular chamber defined by said pipe wall and a second outer shell having a second shell wall:

a second aperture set in said pipe wall and being positioned within said second outer shell wall, said first aperture set and said second aperture set defining an intermediate pipe portion therebetween; and a first tube means having an inlet and outlet, said inlet of said first tube means being connected to said receptacle and said outlet being connected to said second annular chamber;

whereby said gas of said secondary stream will pass from said receptacle chamber through said first tube means and thereafter through said second annular passage, through said second aperture set to recombine with said primary gas stream.

5. A drip as claimed in claim 4 wherein both the first annular chamber and the second annular chamber have cross sectional areas which are substantially the same size.

6. A drip as claimed in claim 4 wherein said first fluid communication means comprises a tube means with an inlet connected to said first annular passage and an outlet connected to said receptacle chamber.

7. A drip as claimed in claim 6 wherein said first tube means has a cross sectional area that is substantially the same size as the cross sectional area of said tube means of said first fluid communication means.

8. A drip as claimed in claim 4 wherein said outlet of said first tube means of said second fluid communication means is connected to said second annular passage upstream in said pipe of said second aperture set.

9. A drip as claimed in claim 8, wherein both the first annular chamber and the second annular chamber have cross sectional areas which are substantially the same size.

10. A drip as claimed in claim 9 wherein said second outer shell is formed integrally with said outer shell and further comprising a baffle means to define said first annular chamber and said second annular chamber.

11. A drip as claimed in claim 1 wherein said first fluid communication means comprises a tube means with an inlet connected to said first annular passage and an outlet connected to said receptacle chamber.

12. A drip as claimed in claim 11 wherein said first annular passage has a cross sectional area, and said tube means of said first fluid communication means has a cross sectional area which is smaller than the cross sectional area of said first annular chamber.

13. A drip as claimed in claim 1 further comprising liquid extraction means for extracting liquid collected in said receptacle chamber.

14. A drip as claimed in claim 1 wherein said first fluid communication means provides for fluid communication between said first annular chamber and said receptacle chamber, at a position in said first annular chamber downstream of said first aperture set.

15. A drip for use in a pipeline system for removing liquid contaminants contained in a two-phase liquid-gas stream, said drip comprising a flow separator, and a receptacle:

said receptacle having a receptacle chamber;

said flow separator comprising:

a pipe permitting fluid flow therethrough, said pipe having a longitudinal axis and a pipe wall, said pipe having an inlet and an outlet, said pipe wall having a first aperture set comprising at least one aperture, and a second aperture set comprising at least one aperture, said first aperture set located between said inlet and said outlet, said second aperture set located between said first aperture set and said outlet, said pipe also having an intermediate portion extending between said first aperture set and said second aperture set;

an outer shell having a shell wall enclosing said pipe from a first position between said inlet and said first aperture set, to a second position between said second aperture set and said outlet, said shell wall and said pipe wall defining an annular chamber therebetween;

means for dividing said annular chamber into a first annular chamber located proximate and enclosing said first aperture set, and a second annular chamber located downstream from said first annular chamber and proximate and enclosing said second aperture set;

said pipe being in fluid communication with said first annular chamber through said first aperture set and said pipe also being in fluid communication with said second annular chamber through said second aperture set;

a first fluid communication means providing for fluid communication between said first annular chamber and said receptacle chamber;

a second fluid communication means providing for fluid communication between said second annular chamber and said receptacle chamber;

said first annular chamber, said second annular chamber and said first and second fluid communication means all being configured such that when a two-phase annular flow mixture of a liquid and a gas is forced into said inlet toward said outlet, a primary stream comprised of substantially all gas will pass by said first aperture set directly into said intermediate portion and a secondary stream comprised of substantially all said liquid and a portion of said gas will flow from said pipe through said first aperture set into said first annular chamber maintaining an annular flow until at least said secondary stream has passed said first aperture set, and thereafter said secondary stream will flow from said first annular chamber into said first fluid communication means, thereafter into said receptacle chamber, said receptacle chamber being sized to permit the deposition of fluid in said receptacle from said secondary stream, said portion of gas in said secondary stream will thereafter flow from said receptacle through said second fluid communication means into said second annular chamber to reenter said pipe through said second aperture set to recombine with said primary gas stream downstream of said first annular chamber, said recombined flow of gas exiting said pipe at said outlet.

16. A drip as claimed in claim 15 wherein said first annular chamber, said second annular chamber and said first and second fluid communication means are all also configured such that when a two-phase annular flow mixture of a liquid and a gas is forced into and flows from said outlet toward said inlet, a primary stream comprised of substantially all gas will pass through said second aperture set directly into said intermediate portion and a secondary stream comprised of substantially all said liquid and a portion of said gas will flow from said pipe through said second aperture set into said second annular chamber maintaining an annular flow until at least said secondary stream has passed said second aperture set, and thereafter said secondary stream will flow from said second annular chamber into said second fluid communication means, thereafter into said receptacle chamber, said receptacle chamber being sized to permit the deposition of fluid in said receptacle from said secondary stream, said portion of gas in said secondary stream will thereafter flow from said receptacle through said first fluid communication means into said first annular chamber to reenter said pipe through said first aperture set to recombine with said primary gas stream downstream of said first annular chamber said recombined gas flow exiting said pipe at said inlet.

17. A drip as claimed in claim 15 wherein said first and second aperture sets each comprise a plurality of apertures circumferentially spaced around said pipe wall.

18. A drip as claimed in claim 15 wherein said first aperture set comprises a single circumferential aperture providing a discontinuity in said pipe.

19. A drip for use in a pipeline system for removing liquid contaminants contained in a two-phase liquid-gas stream, said drip comprising a flow separator, and a receptacle:

said receptacle having a receptacle chamber;

said flow separator comprising:

a pipe permitting fluid flow therethrough, said pipe having a longitudinal axis and a pipe wall, said pipe having an inlet and an outlet, said pipe wall having a first aperture set comprising at least one aperture, said first aperture set located between said inlet and said outlet;

an outer shell having a shell wall enclosing said pipe from a first position between said inlet and said first aperture set, to a second position between said first aperture set and said outlet, said shell wall and said pipe wall defining a first annular chamber therebetween, said pipe being in fluid communication with said first annular chamber through said first aperture set;

a first fluid communication means providing for fluid communication between said first annular chamber and said receptacle chamber;

a second fluid communication means providing for fluid communication between said receptacle and a secondary system;

said first annular chamber and said first and second fluid communication means configured such that when a two-phase annular flow of a liquid and a gas is forced into said inlet toward said outlet, a primary stream comprised of substantially all gas will pass by said first aperture set and exit said pipe at said outlet, and a secondary stream comprised of substantially all said liquid and a portion of said gas will flow from said pipe through said first aperture set into said first annular chamber maintaining an annular flow until at least said secondary stream has passed said first aperture set, and thereafter said secondary stream will flow from said first annular chamber into said first fluid communication means, thereafter to said receptacle chamber, said receptacle chamber being sized to permit the deposition of fluid in said receptacle from said secondary stream, said gas from said secondary stream will thereafter flow from said receptacle through said second fluid communication means to said secondary system.

20. A drip as claimed in claim 19 wherein said first aperture set comprises a plurality of apertures circumferentially spaced around said pipe wall.

21. A drip as claimed in claim 19 wherein said first aperture set comprises a single circumferential aperture providing a discontinuity in said pipe.

* * * * *